United States Patent [19]

Bethards

[11] Patent Number: 5,040,212
[45] Date of Patent: Aug. 13, 1991

[54] METHODS AND APPARATUS FOR PROGRAMMING DEVICES TO RECOGNIZE VOICE COMMANDS

[75] Inventor: Charles Bethards, Colleyville, Tex.

[73] Assignee: Motorola, Inc., Schaumburg, Ill.

[21] Appl. No.: 501,384

[22] Filed: Mar. 19, 1990

Related U.S. Application Data

[63] Continuation of Ser. No. 213,803, Jun. 30, 1988, abandoned.

[51] Int. Cl.$^5$ ............................................. G01L 5/00
[52] U.S. Cl. ................................. 381/41; 364/513.5
[58] Field of Search ........................... 381/41-46, 381/110; 364/513.5; 367/198

[56] References Cited

U.S. PATENT DOCUMENTS

| | | | |
|---|---|---|---|
| 4,233,685 | 11/1980 | Taylor | 455/151 |
| 4,422,071 | 12/1983 | De Graaf | 340/825.44 |
| 4,462,080 | 7/1984 | Johnstone et al. | 364/513.5 |
| 4,525,865 | 1/1985 | Mears | 455/186 |
| 4,593,155 | 6/1986 | Hawkins | 179/2 EA |
| 4,720,802 | 1/1988 | Damoulakis | 381/43 |
| 4,731,811 | 3/1988 | Dubus | 379/58 |
| 4,737,976 | 4/1988 | Borth | 381/46 |
| 4,776,016 | 10/1988 | Hansen | 381/42 |
| 4,797,924 | 1/1989 | Schnars et al. | 381/43 |
| 4,797,929 | 1/1989 | Gerson et al. | 381/43 |
| 4,984,295 | 1/1991 | Engstrom et al. | 455/186 |

FOREIGN PATENT DOCUMENTS

0041195A1 12/1981 European Pat. Off. .
2016768A 9/1979 United Kingdom .

*Primary Examiner*—Emanuel S. Kemeny
*Attorney, Agent, or Firm*—Thomas G. Berry

[57] ABSTRACT

A communication device may be programmed to recognize voice commands via a portable programming apparatus. An identification code is employed to access particular voice recognition information (codebook) from a repository of voice recognition codebooks container within the portable programming device. The programming device responds by transmitting the identified codebook to at least one communication device, which stores the codebook therein. Thereafter, the communication device may respond to the voice commands of that individual.

13 Claims, 4 Drawing Sheets

METHODS AND APPARATUS FOR PROGRAMMING DEVICES TO RECOGNIZE VOICE COMMANDS

This is a continuation of application of application Ser. No. 07/213,803 filed June 30, 1988 and now abandoned.

TECHNICAL FIELD

This invention relates generally to voice recognition, and more particularly to speaker dependent voice recognition applied to information communication systems, and is more specifically directed toward a method for programming communication devices to recognize and respond to voice commands.

BACKGROUND ART

Voice recognition technology has been recognized as an advantageous feature for many product applications. Such technology may be employed to render a product partially or entirely controllable by voice commands in situations where hands-on control is impossible or impracticable. Presently, however, voice recognition technology has not found wide use due to the complexity of its implementation, and requirements for a large amount of electronic storage (memory).

Speaker dependent voice recognition devices are designed to respond to a particular individual. Stored within such devices are speaker specific parameters, such as, for example, variations in the vocal tract response, pitch period, short-term speech power, and amplitude of the short-term speech spectra. In order for a speaker dependent device to respond to more than one person, the voice recognition information (commonly referred to as a "codebook") for each person must be stored within the device. However, mass codebook storage in each subscriber unit (radio) may prove impractical due to space or cost considerations. An alternative may be to use speaker independent technology, however, speaker independent devices are typically more complex and costly.

When applied to information communication devices, voice recognition technology raises several concerns. One major concern comprises the recognition that communication devices are typically used by more than one individual. For example, police vehicles are generally in service for three eight-hour shifts, during which at least three officers use the vehicle. Moreover, the officers using the vehicle (radio) may be anyone on the entire police force. Therefore, each radio must contain a codebook for each officer on the force. This would significantly increase the cost of the radios. Additionally, codebook maintenance costs would be significant since the radios must be updated with each change in personnel. Another concern is the increase in radio size. Contemporary state-of-the-art communication devices are designed so as to minimize their physical size. The addition of several memory devices, or a memory printed circuit board, may increase the size of the device beyond that desired by the consuming public. This is a particular concern in the personal pager and handheld radio products.

One solution may be to store the codebooks of only a few individuals thereby reducing the amount of required memory. However, this approach is inflexible to changing circumstances such as variations in personnel working hours or in the event that the radio itself should fail. Another approach may be to have each radio contain only enough memory for a single codebook, which must be retrained for each person. Speaker dependent voice recognition devices must be "trained" to respond to each individual. Training is accomplished by having an individual repeat control words several times until the device has been "trained" to recognize that word as spoken by that individual. However, training is a time consuming process and may be very inefficient in certain markets, such as police and fire protection, where rapid activity is ordinarily required Accordingly, a need exists in the art to permit information communication devices to be programmed to respond to the voice commands of several individuals in an efficient and organized manner.

SUMMARY OF THE INVENTION

Briefly, according to the invention, a communication device may be programmed to recognize voice commands via a portable programming apparatus. An identification code is employed to access particular voice recognition information (codebook) from a repository containing one or more voice recognition codebooks within the portable programming device. The programming device responds by transmitting the identified codebook to at least one communication device, which stores the codebook therein. Thereafter, the communication device may respond to the voice commands of that individual. In this way, the communication device may be rapidly reprogrammed to accommodate changing operators.

DETAILED DESCRIPTION OF THE PREFERRED EMBODIMENT

Figure 1:
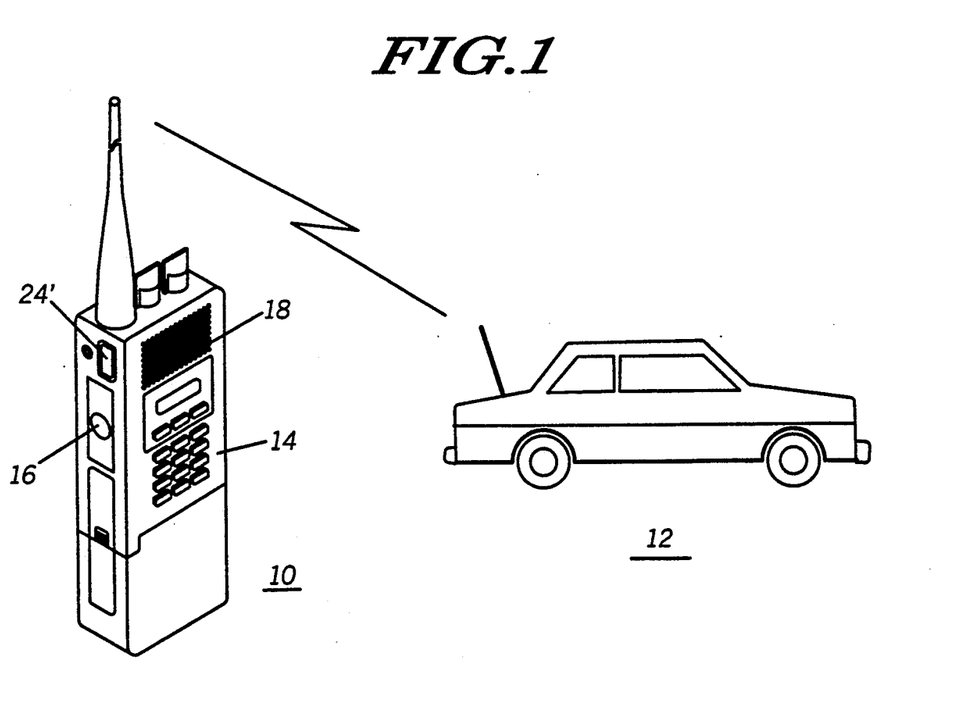
FIG. 1 is an illustration of a programming device in accordance with the present invention, and a vehicle having a mobile subscriber unit installed there.

Referring now to FIG. 1, there is shown a radio frequency programming device (10) communicating with a vehicle (12) having a mobile subscriber unit installed therein. Preferably, the programming device (10) operates as a repository of all of the codebooks for individuals that may operate the subscriber unit. Alternately, the total collection (or library) of codebooks may be apportioned between two or more programming devices.

The subscriber units may be mobile units, portable units, or control stations. Generally, a portable subscriber unit is designed to be carried on or about the person, a mobile subscriber unit is designed to be mounted into vehicles, and control stations are permanent or semi-permanent installations installed in buildings or other fixed locations. As used herein, the term subscribers collectively refers to portable units, mobile units or control stations.

As mentioned above, preferably all required codebooks for all personnel using a communication system are centrally contained in the programming device (10). The programming device thus becomes a central repository (library) of the several codebooks. Preferably, a separate facility may be used to provide "training" of the subscriber units. For example, all codebooks for an entire police force may be created by training a subscriber unit (or its simulated equivalent) at the police station, after which the newly created codebooks may be transferred to the programming device via any convenient means. In this way, the codebook library may be maintained. Alternately, the programming device may allow for creation of codebooks by having subscriber operators train the programming device itself.

Each of the subscriber units contain enough codebook memory to store the codebook for at least one individual. Thus, before an individual may use the subscriber unit, his or her codebook must be transferred from the programming device (10) to the subscriber unit. Preferably, codebook transfer is accomplished by entering a codebook identification code on a keypad (14) and depressing a transfer activation button (or switch) (16). The present invention also contemplates several alternatives to effect codebook transfer. One alternate comprises providing each operator with an identification card (or module) that may be inserted into the programming device, which causes an automatic transfer of the appropriate codebook from the programming device (10) to the subscriber unit. In another embodiment, the programming device may itself be voice controlled (speaker dependent) to transfer an identified codebook. In this way, codebook transfer could be controlled since the programming device would only respond to a limited number of speakers In a further embodiment, the programming device may employ a limited version of speaker independent voice recognition technology, which may be used to effect codebook transfer.

In several circumstances, the operator of the mobile subscriber unit also carries an associated portable subscriber unit, which may be used to maintain communication when the operator is out of the vehicle. Accordingly, the present invention contemplates that the programming device (10) may simultaneously transfer a codebook to a mobile subscriber unit and its associated portable unit.

Once the codebook has been stored in a subscriber unit, the operator may partially (or entirely) control the operation of the subscriber unit by voice commands. Alternately, voice commands may be used in conjunction with manually entered commands (or vice versa) to execute a desired function. Whenever another individual desires to use that subscriber unit (for example, at a change in a working shift), the codebook for the new operator may be rapidly transferred as described above. Optionally, the memory in the subscriber may be expanded (within size and cost constraints) to retain a limited number of the last used codebooks in a first-in-last-out manner. For example, the codebook of the current user and the prior two operators may be retained in the subscriber unit. In this way, if the same three individuals operating the subscriber during the three operating shifts were ordinarily repeated day to day, no reprogramming of the subscriber unit would be required.

Figure 2:
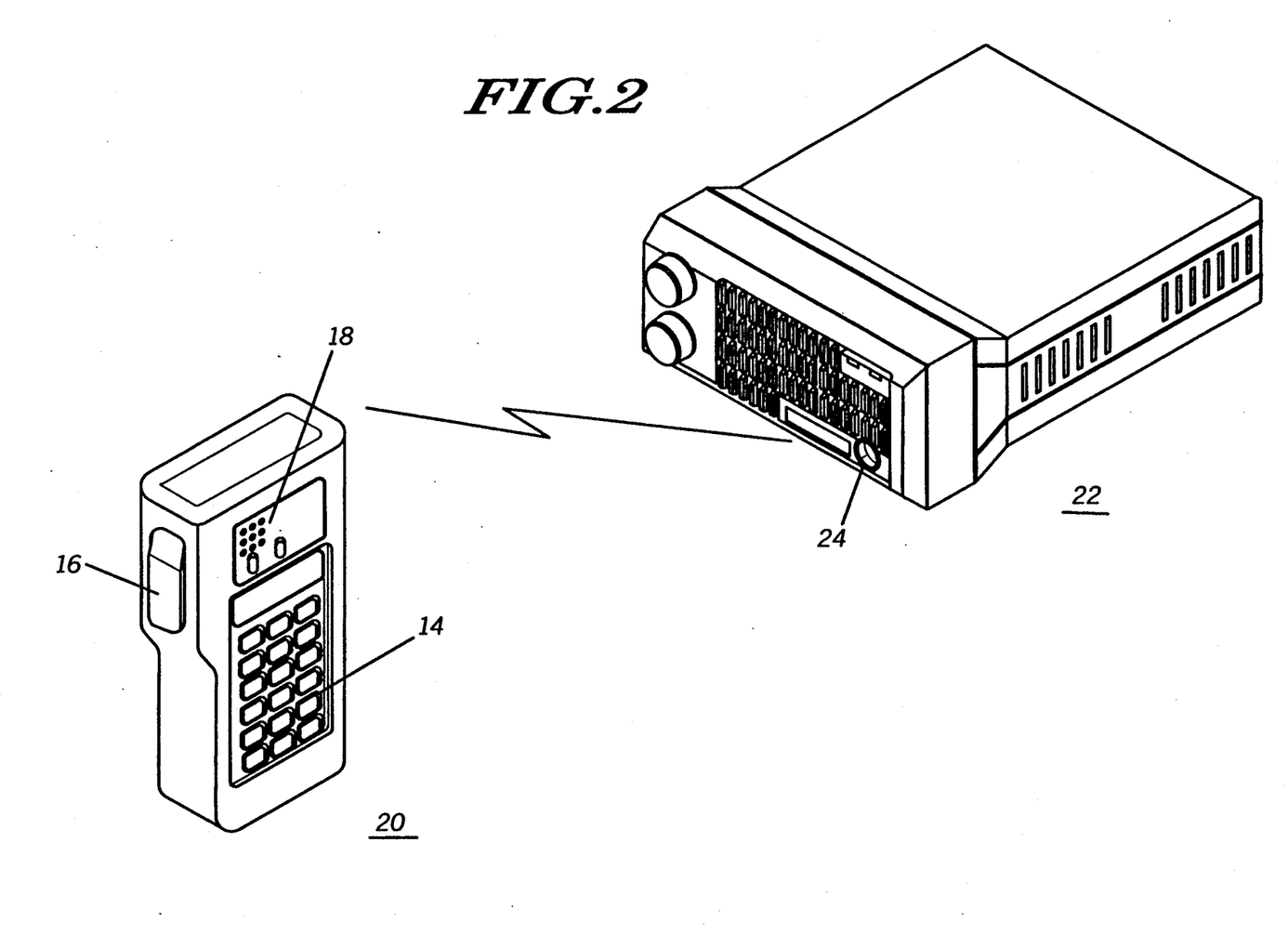
FIG. 2 is an illustration of an alternate programming device in accordance with the present invention, and a mobile subscriber unit.

Referring now to FIG. 2, there is shown a programming device (20) communicating via modulated light waves (optics) with a subscriber unit (22). For example, infrared scattering light may be used to transfer the codebook from the programming device to the subscriber unit. As discussed in conjunction with FIG. 1, a codebook transfer is preferably accomplished by entering a codebook identification code on a keypad (14) and depressing a transfer activation button (or switch) (16). Alternately, identification cards (or modules) may be used to cause an automatic transfer of the appropriate codebook from the programming device (10) to the subscriber unit. Also, the programming device may itself be voice controlled (using speaker dependent or independent technology) to transfer an identified codebook. Lastly, as an alternative to either radio frequency or light wave communication, codebook transfer may be effected via an interface cable (either conductive wire or fiber optic link) between a programming port (24) on the subscriber unit (22), and a programming port (24') on the programming device (10 or 20).

Figure 3:
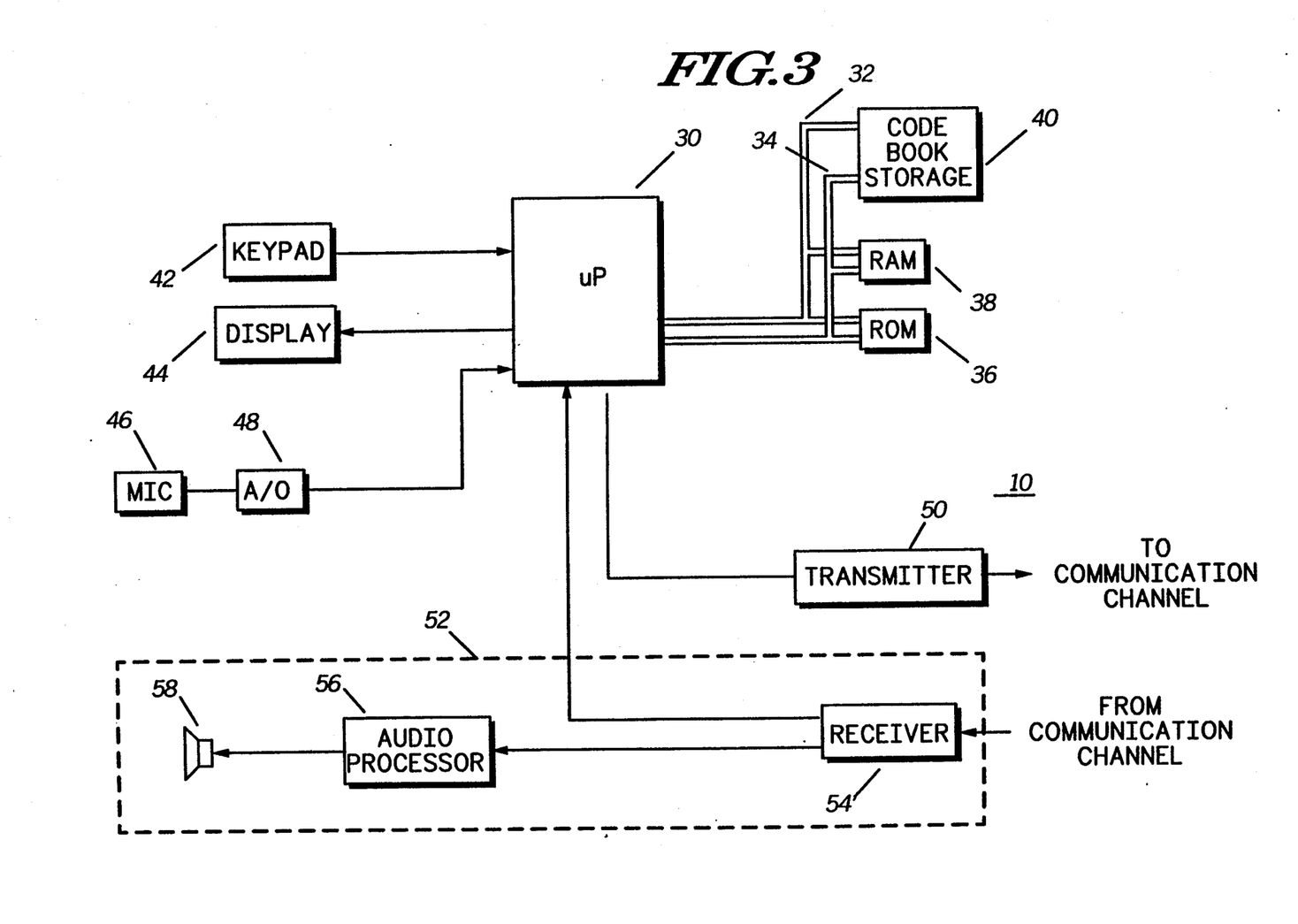
FIG. 3 is a block diagram of the programming device of FIG. 1 or FIG. 2.

Referring now to FIG. 3, there is shown a block diagram of the programing unit (10 or 20). The programming unit operates under the control of a microprocessor (30), which communicates via an address bus (32) and a data bus (34) with read-only memory (ROM) (36) and random access memory (RAM) (38). The codebook for each individual resides in mass codebook storage (40), which preferably comprises electronically erasable programmable read-only memory (EEPROM). Alternately, battery backed-up RAM may be used.

The operator may enter manual commands via the keyboard (42), and receive status or information updates by the display (44). Preferably, in a voice controlled programmer embodiment, voice commands are entered via the microphone (46), which are digitized (48) and processed by the microprocessor (30). Codebook transfer is accomplished via a transmitter (50), which is of a type in accord with the particular communication media employed. That is, an optics transmitter for fiber optic cable or infrared scattered transmission, a radio frequency transmitter for RF communication, or merely a modulator amplifier for wireline transmission. Optionally, the programming device (10) may include a receiver section (52) comprising a receiver (54), which may forward data messages, such as acknowledge messages, to the microprocessor (30), while routing analog messages (such as a programming complete or error signal) to any suitable audio processing stages (56), which may provide an alert tone to the operator via the speaker (58).

Figure 4:
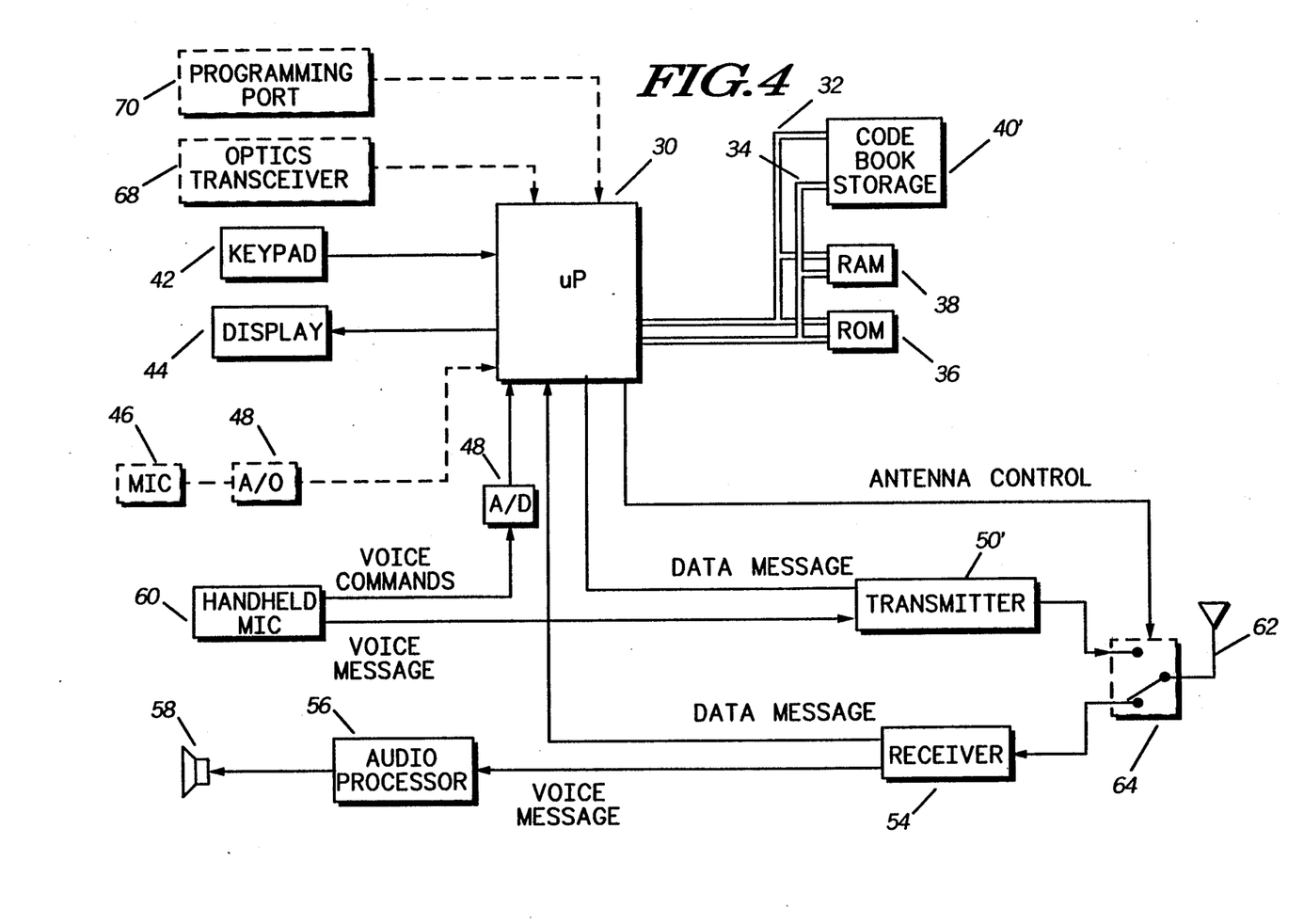
FIG. 4 is a block diagram of a subscriber unit according to the present invention.

Referring now to FIG. 4, there is shown a block diagram of a subscriber unit (22) according to the invention. The subscriber unit also operates under the control of a microprocessor (30), which communicates via an address bus (32) and a data bus (34) with read-only memory (ROM) (36) and random access memory (RAM) (38). The codebook for at least one individual resides in the codebook storage (40'), which preferably comprises electronically erasable programmable read-only memory (EEPROM). Alternately, battery backed-up RAM may be used.

The operator may enter manual commands via the keyboard (42), and receive status or information updates by the display (44). Preferably, voice commands are entered via the handheld microphone (60), which are digitized (48) and processed by the microprocessor (30). Optionally, a condenser microphone (or equivalent) (46) may be mounted on the subscriber unit, to receive voice commands without the necessity of picking up the handheld microphone (60). Voice messages are transmitted via the handheld microphone (60) and a radio frequency transmitter (50'), which may also transmit data messages from the microprocessor (30). The transmitter (50') is selectively coupled to the antenna (62) via the antenna switch (64), which is controlled via the antenna control line (66) from the microprocessor (30). The subscriber unit (14) may also receive data or voice messages via a radio frequency receiver (54'), which forwards data messages to the microprocessor (30), while routing voice messages to any suitable audio processing stages (56), which may provide the voice messages or signalling tones to the operator via the speaker (58).

The subscriber unit (22) may accept a codebook for storage in a variety of ways. In a radio frequency programmer embodiment, a subscriber unit (22) may receive a codebook transmitted from a programming device (10) via the antenna (62), which is coupled (64) to a receiver (54'). The receiver (54') routes the received codebook information to the microprocessor (30), which may store the codebook in the codebook storage (40'). Optionally, an acknowledge message may be transmitted (50') to the programming device (10) to confirm receipt of the codebook. In a optic programmer embodiment, the subscriber unit (22) is equipped with an optical receiver (or transceiver) (68) to enable the subscriber unit to receiver a codebook transmitted by a programmer (20) via, such as, infrared scattering. Lastly, a subscriber may be provided a programming port (70), which may accommodate a wireline or fiber optic cable to enable the subscriber to receive a codebook.

According to the invention, a significant level of voice control, may be accomplished by a limited word set. While total voice control may require several additional words, the present invention contemplates that the subscriber unit may be at least partially controlled by the word set as represented in Table 1 below.

TABLE 1

EMERGENCY
LIGHTS
SIREN
ON
OFF
MONITOR
CANCEL
STATUS
TRANSMIT
RECEIVE
DISPLAY
SCAN
DIAL
CALL
CHANNEL
ACKNOWLEDGE
MESSAGE
NUMBER
ZERO
ONE
TWO
THREE
FOUR
FIVE
SIX
SEVEN
EIGHT
NINE

In summary, the present invention provides that a communication device may be programmed to recognize voice commands via the portable programming apparatus described above. To effect codebook transfer, the programming device receives an identification code, which is used to access particular voice recognition information from a repository of codebooks contained within the portable programming device. The identified codebook is transferred to at least one communication device by modulated radio waves, modulated light waves, or other suitable modulated electronic signals. Upon receipt and storage of the codebook, the communication device may respond to the voice commands of that individual. In this way, the communication device may be rapidly reprogrammed to accommodate changing operators.

What is claimed is:

1. In a communication system having at least one communication unit being at least partially controlled by voice commands, a method for programming said at least one communication unit to recognize said voice commands, comprising the steps of:
   at a programming device having a repository of voice recognition information for at least two individuals stored therein:
   (a) receiving a code identifying data representing at least voice recognition information for at least one individual;
   (b) programming said at least one communication unit to recognize voice commands by transmitting at least said data representing at least voice recognition information via modulated radio frequency or optical signal to said at least one communication unit;
   at said at least one subscriber unit:
   (a) receiving said data representing at least voice recognition information from said at least one programming device.

2. The method of claim 1, which further comprises the step of;
   (a1) coupling an interface means between said programming device and said communication unit prior to said programming step so as to be able to transmit said data representing at least voice recognition information.

3. The method of claim 1, wherein said programming device receiving step comprises: receiving a code entered on a keypad.

4. The method of claim 1, wherein said programming device receiving step comprises:
   (a) receiving a voice signal;
   (b) processing said voice signal to identify said data representing at least voice recognition information;
   (c) programming said at least one communication unit to recognize voice commands to transmitting at least said data representing at least voice recognition information via modulated radio frequency or optical signal to said at least one communication unit.

5. The method of claim 1, which includes the communication unit steps of:
   (b) processing, in the absence of manually entered commands, voice commands in accordance with said data representing at least voice recognition information to at least partially control operation of said communication unit in response to said voice commands;

(c) processing, when said manually entered commands are present, said manually entered commands in cooperation with said voice commands processed in accordance with said data representing at least voice recognition information to at least partially control operation of said communication unit in response to said manually entered commands and said voice commands.

6. The method of claim 1, which includes the communication unit step of: (b) processing voice commands at said subscriber unit in accordance with said data representing at least voice recognition information to at least partially control operation of said communication unit in response to said voice commands.

7. The method of claim 1, which includes the communication unit step of: storing at least a portion of said data representing at least voice recognition information.

8. In a communication system having at least one communication unit being at least partially controlled by voice commands, a method for programming said at least one communication unit to recognize said voice commands, comprising the steps of:
   at a programming device having a repository of voice recognition information for a plurality of individuals stored therein:
   (a) receiving a code identifying data representing at least voice recognition information for at least one individual;
   (b) programming said at least one communication unit to recognize voice commands by transmitting at least said data representing at least voice recognition information via modulated radio frequency or optical signal to said at least one communication unit;
   at said at least one communication unit;
   (a) receiving said data representing at least voice recognition information from said at least one programming device;
   (b) storing at least a portion of said data representing at least voice recognition information;
   (c) processing, in the absence of manually entered commands, voice commands in accordance with said data representing at least voice recognition information to at least partially control operation of said communication unit in response to said voice commands;
   (d) processing, when said manually entered commands are present, said manually entered commands in cooperation with said voice commands processed in accordance with said data representing at least voice recognition information to at least partially control operation of said communication unit in response to said manually entered commands and said voice commands.

9. In a communication system having at least one communication unit being at least partially controlled by voice commands, a method for programming said at least one communication unit to recognize said voice commands, comprising the steps of:
   at a programming device having a repository of voice recognition information for at least two individuals stored therein:
   (a) receiving a code identifying data representing at least voice recognition information for at least one individual;
   (b) programming said at least one communication unit to recognize voice commands by transmitting at least said data representing at least voice recognition information via modulated radio frequency or optical signal to said at least one communication unit;
   at said at least one communication unit:
   (a) receiving said data representing at least voice recognition information from said at least one programming device;
   (b) storing at least a portion of said data representing at least voice recognition information;
   (c) processing voice commands at said communication unit in accordance with said data representing at least voice recognition information to at least partially control operation of said communication unit in response to said voice commands.

10. In a communication system having at least one communication unit being at least partially controlled by voice commands, a method for programming said at least one communication unit to recognize said voice commands, comprising the steps of:
    at a programming device having a repository of voice recognition information for at least two individuals stored therein:
    (a) receiving a voice signal representing at least a code identifying data representing at least voice recognition information for at least one individual;
    (b) transmitting at least said data representing at least voice recognition information via modulated radio frequency or optical signals to said at least one communication unit;
    at said at least one communication unit:
    (a) receiving said data representing at least voice recognition information from said at least one programming device;
    (b) storing at least a portion of said data representing at least voice recognition information;
    (c) processing voice commands at said communication unit in accordance with said data representing at least voice recognition information to at least partially control operation of said communication unit in response to said voice commands.

11. In a communication system having at least one communication unit being at least partially controlled by voice commands, a programming device comprising:
    means for receiving a code identifying data representing at least voice recognition information for at least one individual stored in a repository of voice recognition information for at least two individuals; and
    programming means for programming said at least one communication unit to recognize voice commands, said programming means including transmitter means for transmitting at least said data representing at least voice recognition information via modulated radio frequency or optical signals to said at least one communication unit.

12. In a communication system having at least one communication unit being at least partially controlled by voice commands, a programming device comprising:
    means for receiving a voice signal representing at least a code identifying data representing at least voice recognition information for at least one individual stored in a repository of voice recognition information for a plurality of individuals; and
    programming means for programming said at least one communication unit to recognize voice commands, said programming means including transmitter means for transmitting at least said data representing at least voice recognition information via modulated radio frequency or optical signals to said at least one communication unit.

13. A programming system for programming at least one communication unit to recognize voice commands, comprising:

a programming device, comprising:

means for receiving a code identifying data representing at least voice recognition information for at least one individual stored in a repository of voice recognition information for at least two individuals;

means for transmitting at least said representing at least voice recognition information via modulated radio frequency or optical signals to said at least one communication unit;

said at least one communication unit, comprising:

means for receiving said data representing at least voice recognition information from said at least one programming device.

* * * * *

UNITED STATES PATENT AND TRADEMARK OFFICE
CERTIFICATE OF CORRECTION

PATENT NO. : 5,040,212

DATED : August 13, 1991

INVENTOR(S) : Charles Bethards

It is certified that error appears in the above-identified patent and that said Letters Patent is hereby corrected as shown below:

Column 6, line 56, delete "to" (2nd occurrence) and insert therefor --by--.

Signed and Sealed this

Nineteenth Day of January, 1993

Attest:

DOUGLAS B. COMER

*Attesting Officer*     *Acting Commissioner of Patents and Trademarks*